No. 766,854. PATENTED AUG. 9, 1904.
D. TOWNSEND.
TRAM CAR.
APPLICATION FILED DEC. 16, 1903.
NO MODEL. 2 SHEETS—SHEET 1.

Witnesses
Otto E. Hoddick.
Dena Nelson.

D. Townsend.
Inventor
By A. ？ ？
Attorney

No. 766,854. PATENTED AUG. 9, 1904.
D. TOWNSEND.
TRAM CAR.
APPLICATION FILED DEC. 16, 1903.
NO MODEL. 2 SHEETS—SHEET 2.
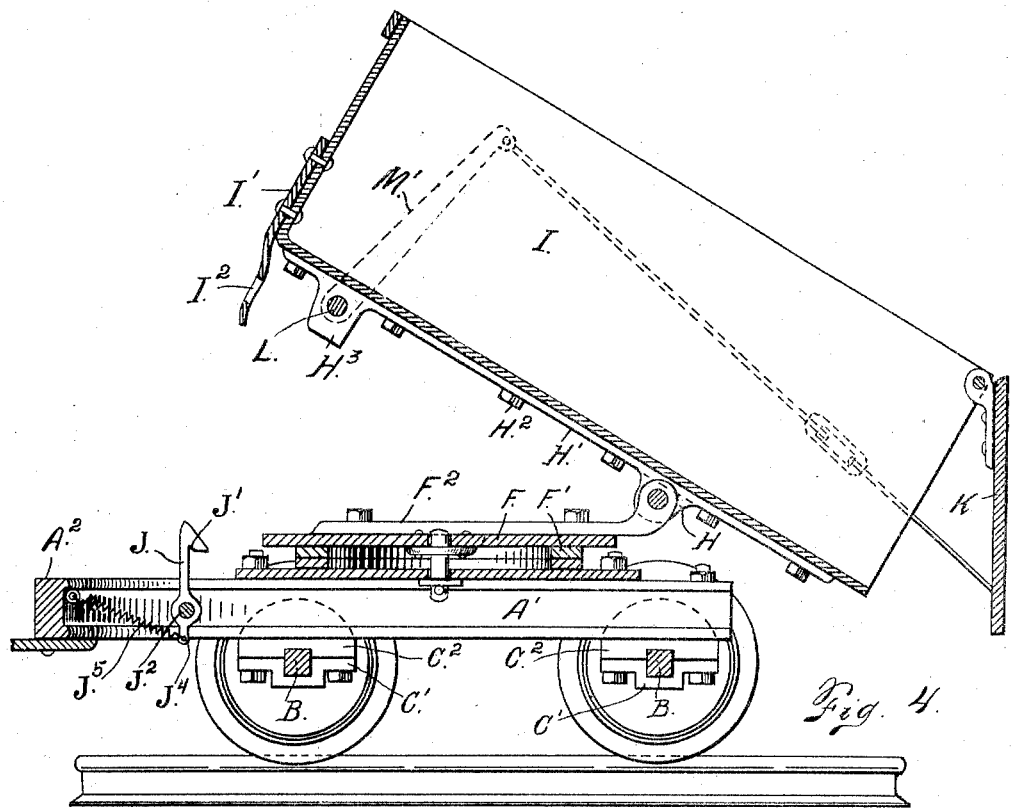
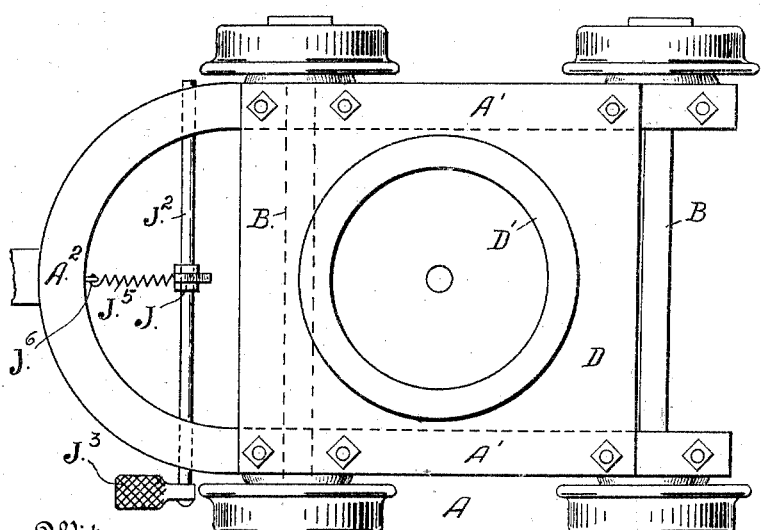

No. 766,854. Patented August 9, 1904.

UNITED STATES PATENT OFFICE.

DANIEL TOWNSEND, OF DENVER, COLORADO.

TRAM-CAR.

SPECIFICATION forming part of Letters Patent No. 766,854, dated August 9, 1904.

Application filed December 16, 1903. Serial No. 185,434. (No model.)

*To all whom it may concern:*

Be it known that I, DANIEL TOWNSEND, a citizen of the United States of America, residing in the city and county of Denver and State of Colorado, have invented certain new and useful Improvements in Tram-Cars; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in tram-cars, and comprises features for controlling the hinged door at the dumping end of the car, whereby the said door may be locked at any desired inclination, thereby controlling the size of the space through which the contents of the car are allowed to pass, and means for releasing the body of the car to allow it to assume the inclined or dumping position.

Figure 1:
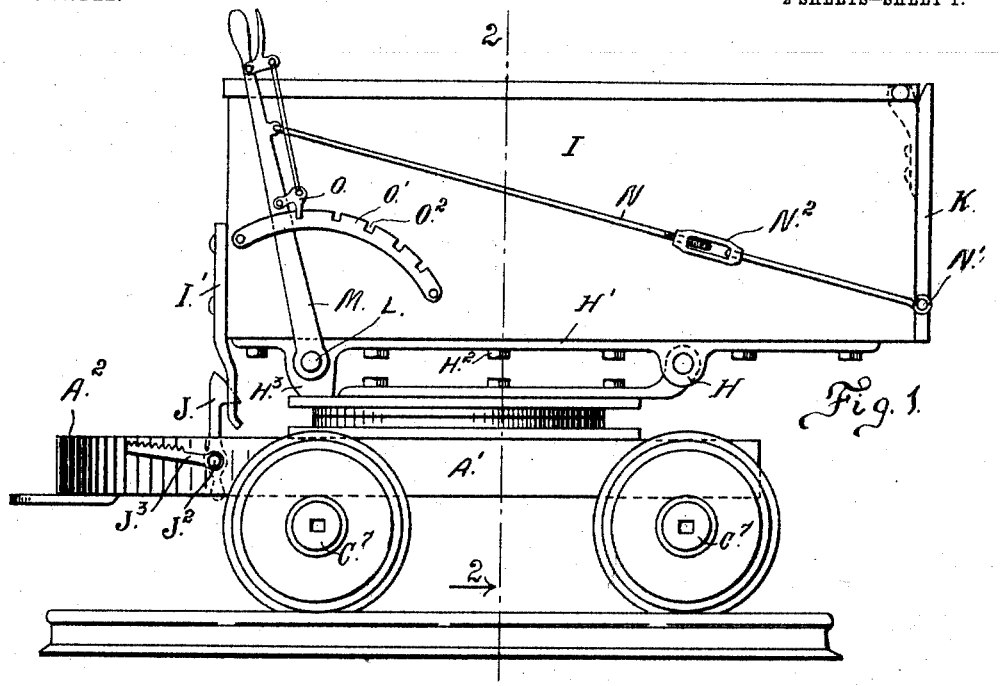
Figures 2, 3:
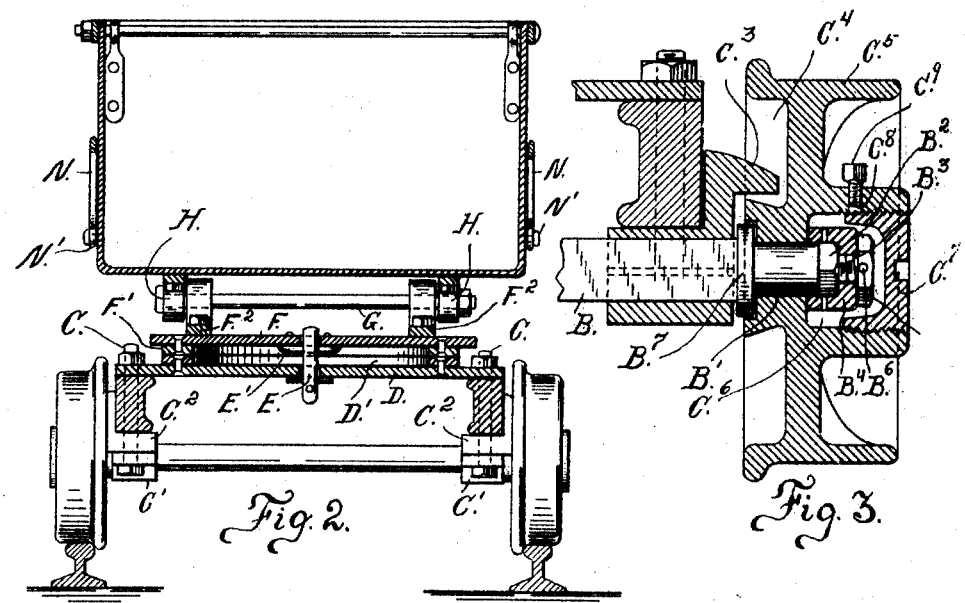

In the drawings, Figure 1 is a side elevation of my improved car. Fig. 2 is a section taken on the line 2 2, Fig. 2. Fig. 3 is a detail sectional view illustrating the wheel construction and the connection between the axles and the frame. Fig. 4 is a vertical longitudinal section taken through the structure. Fig. 5 is a detail top view of the frame.

The same reference characters indicate the same parts in all the views.

Let A designate the frame, which consists of a yoke having parallel side arms A' and a curved part $A^2$, connecting the side arms at their forward extremities. This frame is rigidly secured to the axles B by means of bolts C. Each axle is embraced by a box composed of two parts C' and $C^2$. These box parts are provided with openings on each side of the axle to receive the bolts C, which pass through the said openings and through the side bars of the frame and also through the platform D of the car. The axles are square where the boxes embrace them. The upper box part $C^2$ extends upwardly at the side of the frame-bar and is provided with an outward projection $C^3$, which extends into the hollow portion $C^4$ of the wheel $C^5$ and over the hub of the wheel, thereby protecting the journal B' from the entrance of dirt. Each wheel rotates on the journal part B' of the axle, and its hub is bored exteriorly to form a receptacle $C^6$ for lubricating material. The outer portion $B^2$ of the axle is squared or formed polygonal in cross-section, while extending outwardly from this squared portion is a reduced threaded part $B^3$. A cap-shaped washer $B^4$ is applied to the axle extremity and is provided with a socket which fits the squared part $B^2$ of the axle. This washer projects inwardly to engagement with the wheel and holds the latter from longitudinal movement on the journal. The cap-washer is secured in place by means of a nut $B^5$, screwed upon the threaded extremity of the axle to engagement with the said washer. This nut $B^5$ may be secured in place by passing a pin through an opening $B^6$, formed in the nut, and a registering opening in the threaded journal extremity. The cavity $C^6$ for the lubricant is closed from the outside by means of a screw-plug $C^7$, whose inner surface is hollowed out to form a cavity coöperating with the cavity in the hub of the wheel to form a lubricant-receptacle. When this plug is inserted to the position shown in Fig. 3 in the drawings, it closes an opening $C^8$, through which the lubricating material is inserted. This opening is normally closed by a screw $C^9$. When it is desired to fill the cavity $C^6$ with lubricating material, the plug is unscrewed sufficiently to open the orifice $C^8$, after which the desired amount of lubricating material may be introduced into the cavity through this opening. The inner extremity of the hub of the wheel engages a collar $B^7$, shrunk on the axle.

The stationary platform D is provided with a king-pin E, which passes upwardly through a central opening formed in a platform member F, which is revolubly connected with the stationary platform D. The king-pin is provided with a washer E', made fast thereto and also secured to the platform F, whereby as the last-named platform is rotated the king-pin turns with it in the stationary platform D. The platforms D and F are provided with coöperating engaging rings D' and F'. To the platform F are bolted two arms $F^2$, whose rear extremities are turned upwardly and provided with openings to receive a rod G, which passes through lugs H, formed on strips H', made fast to the bottom of the body of the car by bolts H², whereby the body of the car is pivotally connected with the platform F and adapted to assume the dumping position when desired. The forward extremities of the strips H' are provided with depending lugs H³, which rest upon the platform F when the body of the car is in the horizontal position. The strips H' greatly strengthen the car, while the lugs H³ when engaging the platform F support the body of the car in the horizontal position.

The car-body I is provided at its rear extremity with a depending part I', having an opening I² adapted to receive the hook extremity J' of a dog J, which is made fast to a horizontal rock-shaft J², the latter being journaled in the stationary frame A and provided at one extremity with a foot-crank J³, which is located outside of the frame in order to be conveniently accessible to the person in charge of the car. The dog J projects below the shaft, as shown at J⁴, and with this lower portion is connected a coil-spring J⁵, whose opposite extremity is connected with the forward extremity of the frame, as shown at J⁶. This coil-spring normally holds the dog in the upright position or in position to engage the depending part on the body of the car, whereby the latter is locked in the horizontal position. If it is desired to dump the car, its rear extremity may be released from the dog J by pressing upon the step-crank J³ and turning the rock-shafts sufficiently to disengage the hook J' from the part I'.

In order to control the hinged end door K of the car, I provide a rock-shaft L, journaled in the lugs H³ and extending below the plane of the bottom of the car-body I. To this rock-shaft are attached two levers M and M', which extend upwardly close to the opposite sides of the car-body. These levers M and M' are respectively connected with the rear extremities of two rods N, one on each side of the car. The rear extremities of these rods are connected with the hinged door of the car, as shown at N'. Each of the rods N is composed of two parts connected by a turnbuckle N², whereby the length of the rods may be regulated at will. The lever M on one side of the car is a hand-lever and is provided with a suitably-controlled dog O, adapted to engage a quadrant O', made fast to the side of the car and provided with the ordinary notches O² at suitable intervals, whereby the door K of the car may be locked in any desired position.

It will be understood that it is often important that the whole load of the car should not slide outwardly as soon as possible through the wide-open door. In other words, it is often desirable to control the passage in the door end of the car through which the contents of the car are passing. My improved means just described for opening the door and regulating it make provision for a case of this kind. It will be understood by virtue of this construction that the door may be locked at any desired inclination, according to the speed with which it is desired that the contents of the car-body should escape therefrom.

From the foregoing description the use and operation of my improved tram-car will be readily understood. Assuming that the car is loaded and in the upright position, as shown in Fig. 1, if it is desired to dump the car the lever M is adjusted to open the door K any desired width, in which position the door may be locked by the use of the dog O of the lever. The foot of the operator is then placed upon the crank J³, and by downward pressure thereon the dog is released from the depending part I', attached to the rear extremity of the car-body. The latter will then by a slight upward lift upon its rear extremity assume the inclined or dumping position illustrated in Fig. 4. As soon as its contents have escaped a suitable downward pull on the rear extremity of the car will cause the locking-dog J to engage with the depending part I' and again lock the car-body in the upright position. The door K may then be closed and locked in the closed position through the instrumentality of the controlling devices heretofore described.

Having thus described my invention, what I claim is—

1. The combination with the car-axles, of a frame located above the axles, a platform mounted on the frame, boxes embracing the car-axles, the latter being provided with parts polygonal in cross-section which parts the boxes are made to fit, and bolts passing through the said boxes, the frame and the platform, and suitably secured in place to form a structure relatively stationary with the axles of the car, one part of each box projecting upwardly outside of the frame and outwardly over the hub of the wheel to form a shield or guard.

2. The combination with a suitable framework, of a car-body pivotally mounted thereon whereby it is adapted to assume a position suitably inclined for dumping purposes, the car-body being provided with a hinged door, a hand-operated locking-lever fulcrumed on the car-body, a coöperating notched quadrant, and a suitable connection between the locking-lever and the hinged door whereby the latter may be controlled at will.

3. The combination with a suitable framework, of a car-body pivoted thereon and adapted to assume the dumping inclination, the car-body being provided with a hinged door, and suitable means mounted on the body of the car and controlled at the will of the operator for opening and closing the door and locking it in any desired position of adjustment, said means comprising two levers, link connections between the levers and the door, one of the levers having a handhold extension above its door connection, and a quadrant coöperating with the hand-lever whereby the door may be locked more or less open as may be desired.

4. The combination with the car-body provided with a hinged door, of a pair of levers mounted on the car-body and connected to move in harmony, one of the levers being hand-controlled, means coöperating with the hand-controlled lever for locking the levers in any desired position of adjustment, and rods connecting the levers with the door, each rod being composed of two parts having a turnbuckle connection.

In testimony whereof I affix my signature in presence of two witnesses.

DANIEL TOWNSEND.

Witnesses:
DENA NELSON,
A. J. O'BRIEN.